United States Patent
Chen et al.

(10) Patent No.: US 9,735,844 B2
(45) Date of Patent: Aug. 15, 2017

(54) CHANNEL FEEDBACK FOR COORDINATED MULTI-POINT TRANSMISSIONS

(75) Inventors: Runhua Chen, Plano, TX (US); Vikram Chandrasekhar, Mountain View, CA (US); Eko Onggosanusi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/467,596

(22) Filed: May 9, 2012

(65) Prior Publication Data

US 2012/0287799 A1    Nov. 15, 2012

Related U.S. Application Data

(60) Provisional application No. 61/483,843, filed on May 9, 2011, provisional application No. 61/522,350, filed on Aug. 11, 2011.

(51) Int. Cl.
| H04L 12/26 | (2006.01) |
| H04B 7/024 | (2017.01) |
| H04B 7/06  | (2006.01) |
| H04L 5/00  | (2006.01) |

(52) U.S. Cl.
CPC ........... *H04B 7/024* (2013.01); *H04B 7/0626* (2013.01); *H04B 7/0636* (2013.01); *H04L 5/006* (2013.01); *H04B 7/063* (2013.01); *H04B 7/0639* (2013.01); *H04B 7/0647* (2013.01)

(58) Field of Classification Search
CPC .... H04B 7/024; H04B 7/0626; H04B 7/0639; H04B 7/063; H04B 7/0647; H04B 7/0636; H04W 72/0426; H04L 5/006
USPC ............... 370/312, 328, 329, 332, 334, 252; 375/219, 316
See application file for complete search history.

(56) References Cited

U.S. PATENT DOCUMENTS

| 2010/0027456 A1* | 2/2010 | Onggosanusi et al. ........ 370/312 |
| 2012/0113816 A1* | 5/2012 | Bhattad ............. H04W 72/0426 370/328 |
| 2012/0176884 A1* | 7/2012 | Zhang et al. .................. 370/203 |
| 2012/0257575 A1* | 10/2012 | Davydov et al. ............. 370/328 |
| 2013/0003788 A1* | 1/2013 | Marinier et al. ............... 375/219 |
| 2013/0286997 A1* | 10/2013 | Davydov ............... H04B 7/024 370/329 |

* cited by examiner

*Primary Examiner* — Kwang B Yao
*Assistant Examiner* — Harun Chowdhury
(74) *Attorney, Agent, or Firm* — Ronald O. Neerings; Charles A. Brill; Frank D. Cimino

(57) ABSTRACT

A method of Coordinated Multipoint (CoMP) communication between a base station having a plurality of points with at least one user equipment (UE). At least one UE receives at least one transmission from the base station having the plurality of points. This UE measures downlink channel state information for each of the plurality of points including a rank indicator (RI), a precoding matrix indicator (PMI) and a channel quality indicator (CQI). This UE transmits the downlink channel state information in an uplink feedback channel to the base station.

91 Claims, 5 Drawing Sheets

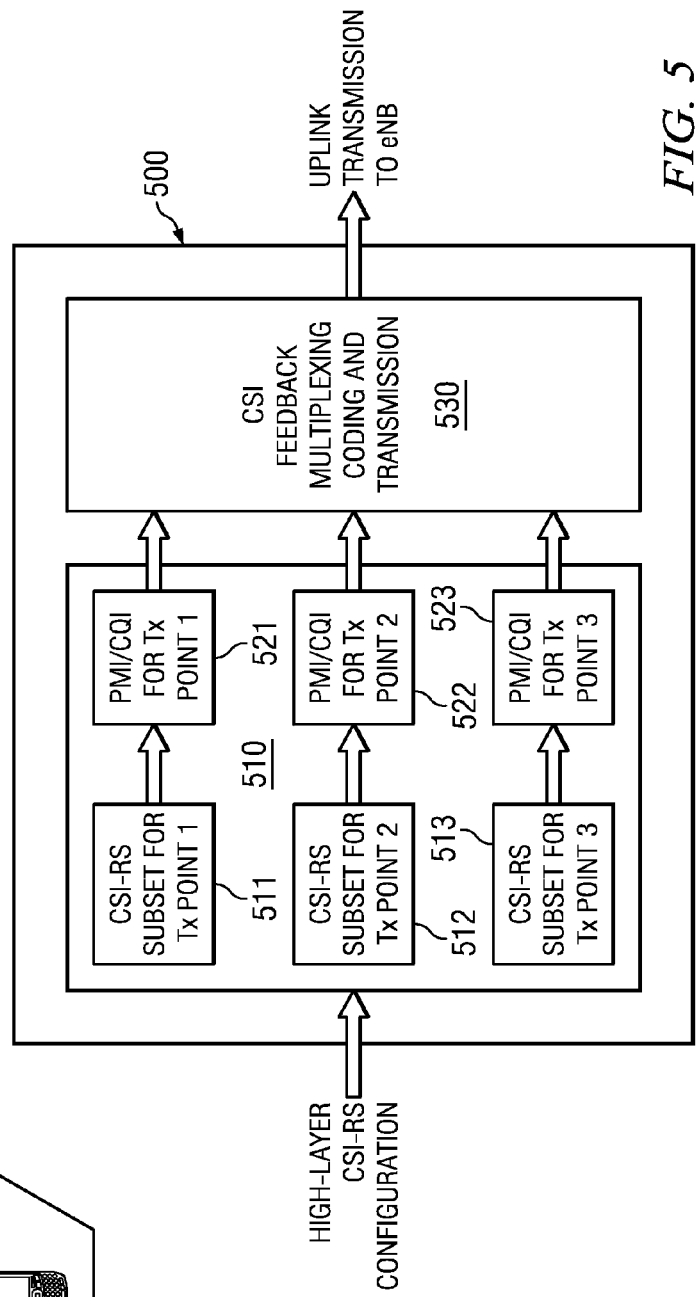
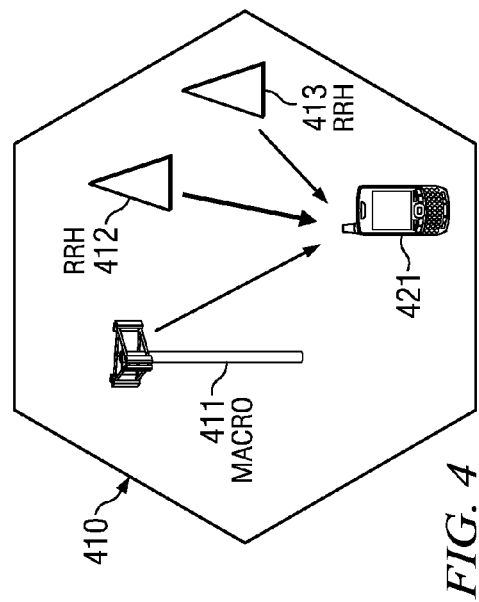
FIG. 4
FIG. 5

CHANNEL FEEDBACK FOR COORDINATED MULTI-POINT TRANSMISSIONS

CLAIM OF PRIORITY

This application claims priority under 35 U.S.C. 119(e)(1) to U.S. Provisional Application No. 61/483,843 filed May 9, 2011 and U.S. Provisional Application No. 61/522,350 filed Aug. 11, 2011.

TECHNICAL FIELD OF THE INVENTION

The technical field of this invention is wireless communication such as wireless telephony.

BACKGROUND OF THE INVENTION

The present embodiments relate to wireless communication systems and, more particularly, to the CoMP or Coordinated Multi-Point Transmission.

The term CoMP stands for Coordinated Multi-Point Transmission. In CoMP multiple transmission points such as macro evolved Node B (eNB), pico eNB, femto eNB, remote radio heads (RRHs), distributed antennas, other wireless transmission entity or combinations coordinate with each other to jointly optimize downlink transmission signals to user equipment (UE). This cooperation includes beamforming vectors, transmission power and/or scheduling decisions. In traditional wireless networks signals from other transmission points are regarded as co-channel interference. In CoMP coordination between multiple transmission points allows the signals to be cooperatively designed to reduce co-channel interference, boost received Signal to Noise Ratio (SNR), improve cell-average throughput and improve cell-edge coverage.

User equipment (UE) feedback is critical for wireless network operation. Each UE measures downlink channel state information (CSI) and reports to the network for downlink scheduling. Implicit feedback is the most prevalent CSI feedback framework. The CSI report is typically in the form of a recommended transmission format, including rank indicator (RI), precoding matrix indicator (PMI) and channel quality indicator (CQI). Rank Indicator (RI) is the number of data streams (layers) for downlink transmission. Precoding matrix indicator (PMI) is the index of the recommended precoding matrix, confined within a given codebook. Channel quality indicator (CQI) is the Signal to Noise Ratio (SNR) values, supported transport block size (TBS), or supported modulation and coding scheme (MCS) that can be used for downlink transmission. In the patent application the CQI may include one or multiple CQI values corresponding to different spatial layers.

Single-cell feedback is the baseline for most existing wireless network standards including LTE Rel. 8/9/10. In the prior art CSI is only measured and reported for the serving cell of a UE from which it receives downlink data. For the serving cell a single RI value is reported for the entire system bandwidth (wideband RI), a single PMI and CQI can be reported for each subband (a continuous frequency spectrum in the system bandwidth). The reported PMI/CQI corresponds to the reported RI value.

SUMMARY OF THE INVENTION

A method of Coordinated Multipoint (CoMP) communication between a base station having a plurality of points with at least one user equipment (UE). At least one UE receives at least one transmission from the base station having the plurality of points. This UE measures downlink channel state information for each of the plurality of points including a rank indicator (RI), a precoding matrix indicator (PMI) and a channel quality indicator (CQI). This UE transmits the downlink channel state information in an uplink feedback channel to the base station.

The rank indicators for the UE for each of the plurality of points may be a common rank.

The transmitted downlink channel state information transmits downlink channel state information for a first point in an uplink feedback channel having a first feedback periodicity and a first timing offset and transmits the downlink channel state information for a second point in an uplink feedback channel having a second feedback periodicity and a second timing offset, said second feedback periodicity differing from said first feedback periodicity. Alternatively the transmitted downlink channel state information transmits downlink channel state information for a first point in an uplink feedback channel having a first feedback periodicity and a first timing offset and transmits downlink channel state information for a second point in an uplink feedback channel having a second feedback periodicity and a second timing offset, said second timing offset differing from said first timing offset.

The UE measure of a CQI employs a multipoint precoding hypothesis, where precoding on each point uses a precoding matrix corresponding to the PMI for said corresponding point. The transmission reports the CQI in the uplink feedback channel. The rank indicators of the CQI equals the rank of a first point.

The UE measures a co-phasing component at least one UE for each of the plurality of points. The transmission reports the co-phasing components in the uplink feedback channel to the base station. The UE measure of a CQI employs a multipoint precoding hypothesis, where precoding on each point uses a precoding matrix corresponding to the PMI for said corresponding point whose phase is rotated by the co-phasing component for said corresponding point. The transmission reports the CQI in the uplink feedback channel. The rank indicators of the CQI equals the rank of a first point.

BRIEF DESCRIPTION OF THE DRAWINGS

These and other aspects of this invention are illustrated in the drawings, in which:

FIG. 4 illustrates an example of heterogeneous transmission points;

FIG. 5 illustrates a first example block diagram of circuits within a user equipment that processes Coordinated Multipoint transmissions;

DETAILED DESCRIPTION OF PREFERRED EMBODIMENTS

Figure 1:
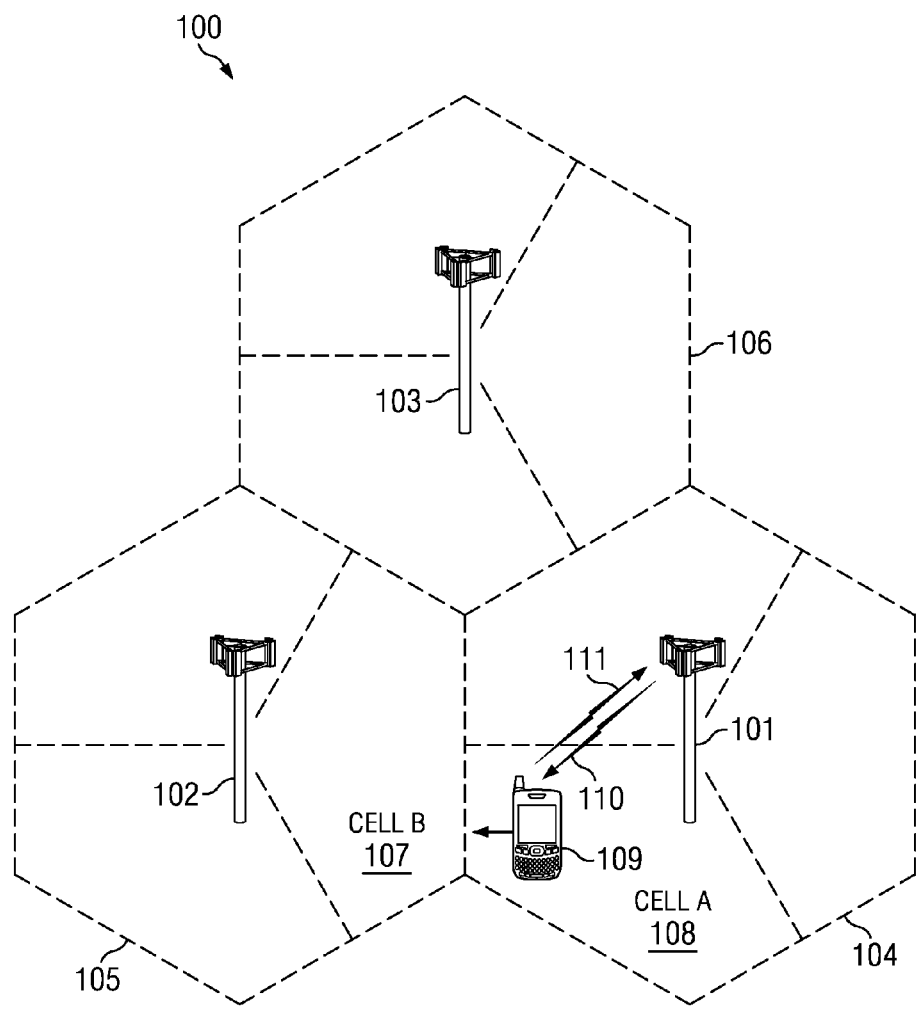
FIG. 1 illustrates an exemplary prior art wireless communication system to which this application is applicable.

FIG. 1 shows an exemplary wireless telecommunications network 100. The illustrative telecommunications network includes points 101, 102 and 103, though in operation, a telecommunications network necessarily includes many more points. Each of the points 101, 102 and 103 (eNB) are operable over corresponding coverage areas 104, 105 and 106. Each point's coverage area is further divided into cells. In the illustrated network, each point's coverage area is divided into three cells. Handset or other user equipment (UE) 109 is shown in Cell A 108. Cell A 108 is within coverage area 104 of point 101. Point 101 transmits to and receives transmissions from UE 109. As UE 109 moves out of Cell A 108 and into Cell B 107, UE 109 may be handed over to point 102. Because UE 109 is synchronized with point 101, UE 109 can employ non-synchronized random access to initiate handover to point 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies point 101 that UE 109 requires up-link resources to transmit the UEs data. Point 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by point 101, UE 109 optionally adjusts its transmit timing and transmits the data on up-link 111 employing the allotted resources during the prescribed time interval.

Point 101 configures UE 109 for periodic uplink sounding reference signal (SRS) transmission. Point 101 estimates uplink channel quality information (CSI) from the SRS transmission.

Figure 2:
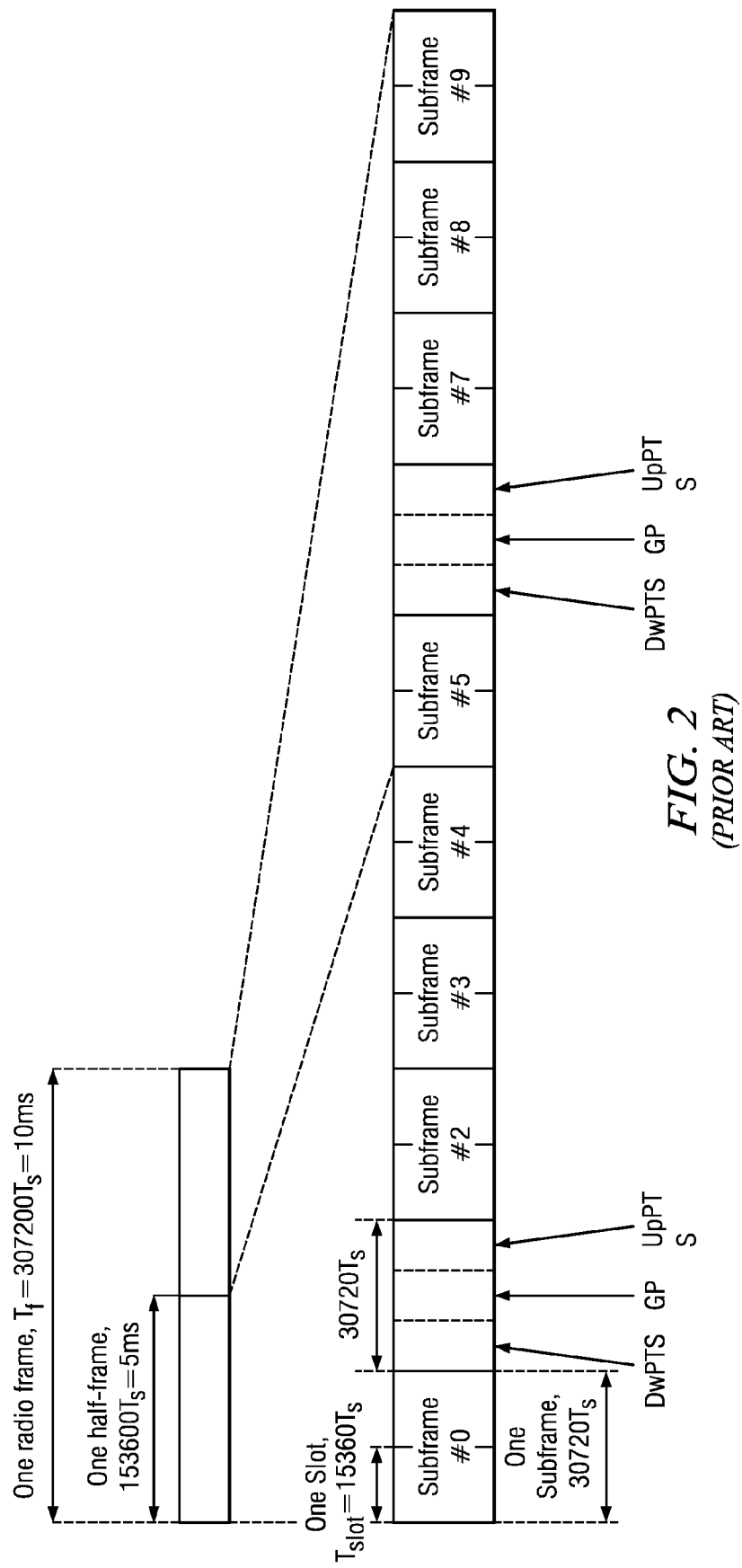
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Config-uration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Figure 3:
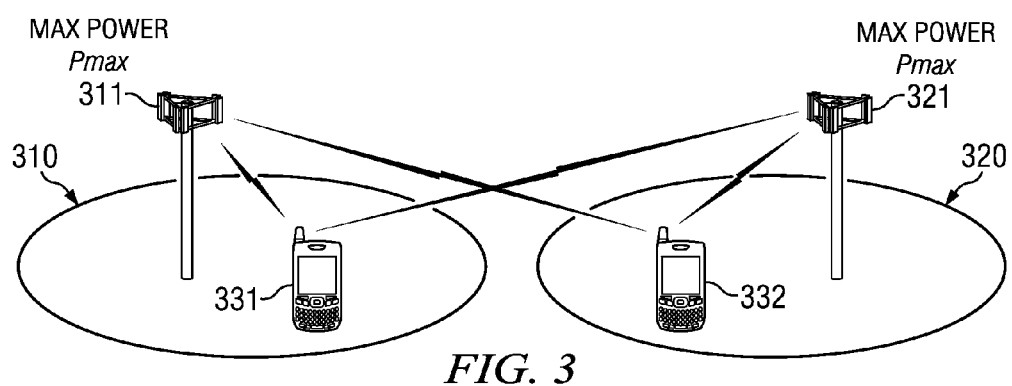
FIG. 3 illustrates a simplified CoMP example to which this invention is applicable.

FIG. 3 illustrates a simplified CoMP example to which this invention is applicable. Cell 310 is served by point 311. Cell 320 is served by point 321. Point 311 communicates with both UE 331 in cell 310 and UE 332 in cell 320. Point 321 communicates with both UE 331 in cell 310 and UE 332 in cell 320. For CoMP operation CSI feedback needs to be extended to multiple transmission points so that they can coordinately schedule downlink CoMP transmission. Inventions in this documents are focused on the multi-cell feedback for CoMP.

This invention is a manner of multi-cell feedback for CoMP. In this invention implicit CSI is reported for each individual cell. The following conventions are used in this application. A cell is the logical signaling identity uniquely determined by the cell identification number (cell-ID) configured by the network. Thus a macro eNB may be configured with one cell-ID. However, a cell-ID may correspond to more than one physical downlink transmission entities such as multiple geographically located RRHs may be configured with the same cell-ID. In that case a UE cannot physically differentiate such multiple transmission entities because they appear as a virtual single transmitter in the physical layer. A cell can be configured to be associated with a set of reference symbols such as Channel State Information Reference Signal (CSI-RS) in LTE Rel. 10. The network may configure multiple CSI-RS measurement sets, where the UE performs CSI measurement for each respective configured CSI-RS set. In this patent application the terms cell and CSI-RS measurement set are used interchangeably.

In this invention for a first cell or a first CSI-RS measurement set the UE performs single-cell CSI feedback, including $RI\_1$, $PMI\_1$ and $CQI\_1$. $RI\_1$ is the recommended rank for single-cell SU-MIMO transmission from the first cell. PMI 1 is the index of the recommended SU-MIMO precoding matrix for the first cell. $CQI\_1$ is the CQI value(s) when $RI\_1/PMI\_1$ are used for downlink SU-MIMO transmission in the first cell. Thus $PMI\_1/CQI\_1$ corresponds to the rank $RI\_1$. This feedback ($RI\_1$, $PMI\_1$, $CQI\_1$) is important for fall-back to single-cell transmission in the first cell to ensure smooth and seamless switching between CoMP and non-CoMP transmission. $RI\_1$ is reported by the UE and chosen from the allowed rank candidates given by the codebook subset restriction. Alternatively $RI\_1$ can be fixed or semi-statically configured by the higher-layer Radio Resource Control (RRC) message such as $RI\_1=1$. In this case $RI\_1$ is not reported.

For each of the remaining non-serving cells or the remaining CSI-RS measurement set, $k=2, \ldots N$. The UE may optionally report $PMI\_k$ to indicate the recommended precoding matrix for cell k. There are various possibilities for derivation of $PMI\_k$. The natural solution derives $PMI\_k$ under the hypothesis of SU-MIMO transmission from cell k. The feedback denotes the rank of $PMI\_k$ as $RI\_k$. There are the following embodiments of the rank value $RI\_k$. In a first alternative $RI\_k$ is determined by the UE and can change on a dynamic subframe-by-subframe basis. In this case $RI\_k$ is reported in the uplink channel.

The UE may report a single-cell RI/PMI/CQI for each cell under a single-cell SU-MIMO transmission hypothesis. In a second alternative $RI\_k$ is semi-statically configured by the higher-layer RRC signaling. In this case $RI\_k$ is not reported. For example the higher layer may configure cell k to report rank-1 PMI only. In a third embodiment $RI\_k$ is determined by the UE and can change dynamically. The ranks ($RI\_k, k=1 \ldots N$) shall take on the same value for all cells. As a result, $RI\_k$ must take the same value as the first cell, thus $RI\_k=RI\_1$. In this case, $RI\_k$ may not need to be explicitly reported in the feedback channel.

The UE may report single-cell CQI denoted as $CQI\_k$ under the hypothesis of single-cell SU-MIMO transmission from cell k. This assumes the use of rank $RI\_k$ and precoding matrix $PMI\_k$.

The UE may report co-phasing information between the first cell and the k-th cell for multi-cell MIMO transmission. A L-bit component per cell for co-phasing can be reported. This L-bit component per cell is derived in the M-PSK modulation alphabet where $M=2^L$. This denotes the co-phasing component for the k-th cell as $\alpha_k$.

The UE may also report a CoMP CQI ($CQI_{CoMP}$) derived under the hypothesis of SU-MIMO transmission from all the CoMP cells. $CQI_{CoMP}$ is useful for CoMP scheduling and link adaptation when the UE is scheduled in CoMP transmission mode. $CQI_{CoMP}$ is derived assuming a multi-cell beamforming vector as:

$$v = \begin{pmatrix} v_1 \\ \exp(j\alpha_2)v_2 \\ \exp(j\alpha_N)v_N \end{pmatrix} \quad (1)$$

where: $v_k$ is the precoding matrix hypothesis for $CQI_{CoMP}$ derivation for the k-th cell denoted as $PMI_{CoMP,k}$, corresponding to rank value of $RI_{CoMP}$.

The configuration of $RI_{CoMP}$, $PMI_{CoMP}$ and $CQI_{CoMP}$ is as follows. In one embodiment the UE performs rank adaptation for multi-cell CoMP and feeds back $RI_{CoMP}$, $PMI_{CoMP,k}$ and $CQI_{CoMP}$. $RI_{CoMP}$ can take on the same value as the per-cell rank report of the first cell (RI_1). If the rank feedback of all cells are confined to take on a common rank value, $RI_{CoMP}$ should be of the same rank value ($RI_{CoMP}$=RI_k, for all k=1, . . . N).

In a second embodiment the rank for CoMP transmission $RI_{CoMP}$ is fixed or semi-statically configured by higher layer RRC signaling. For example, the network may configure $RI_{CoMP}$=1, so that $CQI_{CoMP}$ correspond to rank-1 transmission only. Under this rank assumption, the UE feeds back $PMI_{CoMP,k}$ and $CQI_{CoMP}$. A CoMP UE is usually located at cell-edge and therefore more likely to be scheduled in a low rank transmission. In a third embodiment $RI_{CoMP}$ is different from the per-cell rank RI_k, the precoding vector for CoMP ($PMI_{CoMP,k}$) must be different from the single-cell PMI vector (PMI_k) and shall be reported. Otherwise if $RI_{CoMP}$ is equivalent to the per-cell value RI_k, the precoding vector $PMI_{CoMP,k}$ can be either (1) explicitly reported in addition to PMI_k or (2) not reported and the network assumes $PMI_{CoMP,k}$=PMI_k.

These feedback components can be reported at the same or different time domain periodicities and offsets. They can be reported together in the same subframe or separately in different subframes. Alternatively, during each feedback reporting subframe the UE may cycle through its list of transmission points for CSI reporting.

Further these feedback components may be either transmitted on orthogonal uplink resources or alternatively transmitted on the same set of uplink resources by multiplying each feedback component with a complex orthogonal spreading codes sequence. This complex orthogonal spreading codes sequence may be either in time-domain across a set of OFDM symbols occupying a given resource element or in frequency-domain across a set of resource elements within a given OFDM symbol. These can be chosen from the set {[1,1,1,1], [1,-1,1,-1], [1,1,-1,-1], [1,-1,-1,1], [j,j,j,j], [j,-,j,j,-,j], [j,j,-,j,-,j], [j,-,j,-,j,j]}.

It is also possible for the $CQI_{CoMP}$, and/or the $RI_{CoMP}$ and the $PMI_{CoMP}$ to be derived from a subset of the CoMP cells $\bar{\Omega}$ instead the set of all CoMP measurement cells $\Omega$. In this case the subset of CoMP cells $\bar{\Omega}$ is also known by the network. In a first embodiment the subset of cells $\bar{\Omega}$ is determined at the UE based on UE measurement and reported in the uplink channel. In a second embodiment higher-layer signaling configures the CoMP cell subset $\bar{\Omega}$ and sends this configuration information to the UE. This is possible where the higher layer configure multiple subsets $\bar{\Omega}$. For example let the CoMP measurement cell set $\Omega$ be {1,2,3}. Higher layers can configure multiple CoMP measurement subsets such as $\bar{\Omega}_1$={1,2} and $\bar{\Omega}_2$={1,3}. Then for $\bar{\Omega}_1$ and $\bar{\Omega}_2$ $CQI_{CoMP}$ can report multi-cell beamforming on the corresponding subset.

It is preferable that the primary transmission point informs its neighbors whether or not they form part of the CoMP measurement set for the UE of interest. The primary transmission point informs all cells in the set $\Omega$ regarding which cells are used to form the CoMP measurement subsets with $\bar{\Omega}_1 \subset \Omega$. For example for a particular UE i, assume its CoMP measurement set equals $\bar{\Omega}_i \subset \Omega$. The primary transmission point sends a bitmap corresponding to $\bar{\Omega}_i \subset \Omega$ to the remaining members of the set $\Omega$. A value of 1 in the bitmap indicates that a particular cell is part of the set $\bar{\Omega}_i \subset \Omega$ and a value of 0 indicates otherwise. This signaling is through a bit-map such as a X2-backhaul or over a low latency high capacity backhaul link. The bit-map has a length which is either fixed or equals the size of the CoMP set $\Omega$.

The following is a number of possible embodiments in the framework proposed above.

Example 1

UE reports

Cell 1:   RI_1, PMI_1, CQI_1

...

Cell N:   RI_N, PMI_N, CQI_N.

Assume N=2 RRH distributed alternatively along the highway and configured with different CSI-RS sets. As a UE moves along the highway, the network shall compare the CSI feedback received from the two RRHs to determine which RRH to serve the UE.

Example 2

UE reports

Cell 1:   PMI_1, CQI_1

...

Cell N:   PMI_N, CQI_N.

Here RI is fixed or semi-statically configured such as 1 for all cells. This may be more appropriate for high-speed railroad scenario where rank-1 SU-MIMO transmission is most robust.

Example 3

UE reports

Cell 1:   RI_1, PMI_1, CQI_1

Cell 2:           PMI_2, CQI_2

...

Cell N:           PMI_N, CQI_N.

Here rank adaptation is only supported for a principle cell while all other cells assume either (1) a fixed rank transmission such as rank-1 or (2) a rank value equivalent to the first cell where RI_k=R_1 for k=2, . . . N.

Example 4

UE reports

| | | | |
|---|---|---|---|
| Cell 1: | RI_1, PMI_1, | CQI_1, | $PMI_{CoMP,1}$ |
| Cell 2: | | $PMI_{CoMP,2}$, | $\alpha_2$ |
| ... | | | |
| Cell N: | | $PMI_{CoMP,N}$, | $\alpha_N$ |
| For CoMP: | | $CQI_{CoMP}$ | |

$CQI_{CoMP}$ is derived assuming a SU-MIMO transmission with a multi-cell beamforming vector based on per-cell precoder $\{PMI_{CoMP,1}, PMI_{CoMP,2}, \ldots PMI_{CoMP,N}\}$ and co-phasing $(\alpha_2, \ldots \alpha_N)$ given in Equation (1). The rank of $\{PMI_{CoMP,1}, \ldots PMI_{CoMP,N}\}$ is $RI_{CoMP}$ which is fixed or semi-statically configured by higher-layer. Thus the CoMP transmission is confined to this restricted rank.

Example 5

UE reports

| | | | |
|---|---|---|---|
| Cell 1: | RI_1, PMI_1, | CQI_1, | $PMI_{CoMP,1}$ |
| Cell 2: | | $PMI_{CoMP,2}$, | $\alpha_2$ |
| ... | | | |
| Cell N: | | $PMI_{CoMP,N}$, | $\alpha_N$ |
| For CoMP: | | $CQI_{CoMP}$, | $RI_{CoMP}$ |

Example 5 is similar to Example 4 except that rank adaptation is enabled for CoMP transmission and hence $RI_{CoMP}$ is reported.

Example 6

UE reports

| | | | |
|---|---|---|---|
| Cell 1: | RI_1, PMI_1, | CQI_1 | |
| Cell 2: | | $PMI_{CoMP,2}$, | $\alpha_2$ |
| ... | | | |
| Cell N: | | $PMI_{CoMP,N}$, | $\alpha_N$ |
| For CoMP: | | $CQI_{CoMP}$ | |

$CQI_{CoMP}$ is derived assuming a SU-MIMO transmission from all CoMP cells with a multi-cell beamforming vector based on per-cell precoder $\{PMI_{CoMP,1}, \ldots PMI_{CoMP,N}\}$ with co-phasing $\{\alpha_2, \ldots \alpha_N\}$ given in Equation (1), where $PMI_{CoMP,1}=PMI\_1$. The rank of CoMP transmission is RI_1 thus $\{PMI_{CoMP,1}, \ldots PMI_{CoMP,N}\}$ and $CQI_{CoMP}$ are of rank RI_1.

This invention proposes a unified feedback framework for CoMP. There are the following four cases. The first case has a homogeneous network with intra-site CoMP. The second case has a homogeneous network with high Tx power RRHs. The third case has a heterogeneous network with low power RRHs within macrocell coverage. The fourth case has a network with low power RRHs within the macrocell coverage where the transmission/reception points created by the RRHs have the same cell IDs as the macro cell.

FIG. 4 illustrates an example of one of these cases. Cell 410 is primarily served by macro evolved Node B (eNB) 411. User equipment 421 also communicates with remote radio heads (RRHs) 412 and 413 also located in cell 410.

A number of possible CoMP transmission schemes have been identified for these cases including the following. In Joint Processing (JP) data for a UE is available at more than one point in the CoMP cooperating set for a time-frequency resource. This includes Joint Transmission (JT) having simultaneous data transmission from multiple points to a single UE or multiple UEs in a time-frequency resource. Data to a UE is simultaneously transmitted from multiple points either coherently or noncoherently to improve the received signal quality and/or data throughput and/or to reduce interference activity. This includes Dynamic Point Selection (DPS) which has data transmission from one point at each time instance. The transmitting point may change from one subframe to another. Data is available simultaneously at multiple points.

A second possible CoMP transmission scheme is Coordinated Scheduling/Beamforming (CS/CB). Data for an UE is only available at one point in the CoMP cooperating set for a specific time resource such as a subframe. DL data transmission to the UE is done from that point. User scheduling/beamforming decisions are made with coordination among points corresponding to the CoMP cooperating set. The used point can be chosen dynamically or semi-statically. This includes Dynamic point selection (DPS) where data transmission is made from one point at a time. The transmitting point may change from one subframe to another and may vary over the RB pairs within a subframe but data is never available simultaneously at multiple points. This also includes Semi-static point selection (SSPS) which allows transmission to a specific UE from one point at a time. The transmitting point may only change in a semi-static manner.

With the introduction of Demodulation Reference Signal (DMRS) DL beamforming becomes largely UE-transparent. Thus a UE doesn't need to know the source and exact format of beamforming signals. Since the beamformed signals are a superposition of each RRH's transmission, a UE only needs to know the DMRS ports usage to measure the effective precoded channel. The UE does not need to know which RRH is actively transmitting data. Such Transmit Point transparency makes it possible to greatly simplify the DL control signaling design and reuse much of the existing control channel format design. It is not necessary for a UE to know the exact RRH(s) transmitting Physical Downlink Shared CHannel (PDSCH) to this UE. CoMP beamforming is mostly an eNB implementation issue that can be transparent to the UE. The LTE Rel.10 control channel format designs may be re-used.

The exact CoMP transmission scheme (JT, CB/CS, DPS) is usually an implementation choice made by the eNB depending on the system operation environments such as cell traffic loading, interference property, traffic scenarios, UE mobility, etc. It is possible for different UEs to be scheduled with different CoMP transmission schemes depending on their spatial distribution. Thus a transmission point may be transmitting with JT in one frequency resource to UE A, while transmitting with CB/CS in another frequency resource to UE B. Switching between different CoMP schemes may occur dynamically or semi-statically. A UE does not need to know the exact CoMP scheme for its PDSCH, thanks to the PDSCH decoding transparency due to DMRS. Dynamic switching between different CoMP transmission schemes is also possible due to the DMRS-based precoding. This is very similar to dynamic SU/MU-MIMO switching in LTE Rel. 10. From a UE perspective, the exact CoMP scheme can be transparent (JT, CB/CS, DPS), similarly to the transparency of SU/MU-MIMO in LTE Rel. 10. Dynamic switching between various CoMP schemes is possible due to the support of DMRS. Dynamic fall-back to single-cell transmission is desirable. For feedback in support of CoMP transmission, it is therefore preferable to have a unified, or a small number of CoMP feedback solutions to support as many CoMP schemes as possible. The same principle applies to the DL control signal design as well.

This invention includes the following. As a CoMP feedback baseline, the higher layer configures multiple CSI-RS measurement configurations. Each CSI-RS measurement configuration is a certain CSI-RS pattern corresponding to a specific number of CSI-RS antenna ports, CSI-RS pattern, periodicity and offset, and CSI-RS power. Each CSI-RS measurement configuration can be linked to a TX point. This linkage is up to eNB implementation and could be transparent to the UE. Each CSI-RS measurement configuration has a corresponding UE reporting the per-point PMI $w_k$ and per-point CQI $\rho_k$. The per-point PMI $w_k$ reflects the spatial channel direction associated with each point. The per point CQI reflects the overall channel strength and power.

In Rel. 10 the eNB higher-layer configures one CSI-RS measurement configuration for CSI feedback for each UE, corresponding to a single cell, the serving cell). In Rel. 11 the higher-layer may configure multiple CSI-RS measurement configurations for a UE to report multiple set of CSI information. Likewise each CSI-RS measurement configuration specifies the number of CSI-RS antenna ports, a corresponding CSI-RS pattern, CSI-RS periodicity and offset. The eNB links each CSI-RS configuration to the RRHs so that this linkage is transparent to the UE. In a network with one macro point overlaid with N=2 RRH, the higher layer may configure 3 CSI-RS measurement configurations for each UE corresponding to the respective macro and RRH measurements. The eNB may configure two CSI-RS measurement configurations, one corresponding to the macro and one corresponding to the aggregation of two RRHs. This configuration is an eNB implementation choice and could be transparent to the UE. It is possible that each CSI-RS measurement configuration corresponds to one RRH (transmission point). It is also possible for a specific CSI-RS measurement configuration pattern correspond to a subset of RRH transmission points. This linkage is configured by the eNB implementation.

The baseline CoMP CSI feedback supports all the CoMP schemes previously discussed. In Joint Transmission (JT) the per-point PMI reflects the spatial channel direction associated with each point, while per point CQI reflects the overall channel strength and power related to each TX power. This can be used as a reference to the per-point beamforming weight for joint processing. The per-point CQI/PMI can also be used for single-cell SU/MU-MIMO beamforming in case the eNB decides to fall back to single-cell transmission. Such a fall-back mechanism is desirable to maintain a seamless and robust connection in the network. This is similar to the fall back to Tx diversity in Rel. 8 and fall-back to SU-MIMO transmission in Rel. 10. In Coordinated Scheduling/Beamforming (CB/CB) for the serving point where PDSCH is transmitted, the per-point PMI reflects the eigen direction as a reference to the precoding matrix. The per-point CQI reflects the channel strength as an indication to the downlink modulation/coding scheme selection. Similarly for the non-serving point the per-point PMI is the quantization of the direction of the interference channel. The eNB could use the per-point PMI feedback from UEs in other cells to optimize its beamforming signal to minimize the interference it created toward other cells. The per-point CQI of the non-serving points is a quantization of the interference signal strength and could be used to calculate the residual interference after precoding. In Dynamic Point Selection (DPS) the per-point CQI permits the eNB to select the optimal transmit point with the most robust signal, and the per-point PMI shall be used for single-cell beamforming.

FIG. 5 illustrates a block diagram of circuits within a user equipment that process these Coordinated Multi-point transmissions. User equipment 500 receives higher-layer CSI-RI configuration, generally from the main serving eNB. Receiver 510 separately processes data for distinct transmission points. FIG. 5 illustrates an example where receiver 510 of user equipment 500 is responsive to three transmission points such as illustrated in FIG. 4. Block 511 processes the CSI-RS subset data for a first transmission point (TX point 1). Block 521 forms the PMI/CQI feedback data for this first transmission point. Block 512 processes the CSI-RS subset data for a second transmission point (TX point 2). Block 522 forms the PMI/CQI feedback data for this second transmission point. Block 513 processes the CSI-RS subset data for a third transmission point (TX point 3). Block 523 forms the PMI/CQI feedback data for this third transmission point. All the feedback data is supplied to transmitter 530. Transmitter 530 transmits the CSI feedback multiplexing, coding and transmission data via an UL to generally the primarily serving eNB. This receiving eNB then coordinates with the other serving points for communication with user equipment 500.

In addition to the per-point CQI/PMI information associated with each transmission point, additional CSI information related to interpoint channel property may be needed for coherent joint processing. This invention includes the following. On top of the baseline per-point CQI/PMI feedback, the eNB higher layer may configure additional CSI-feedback information regarding the inter-point channel for each configured CSI-RS measurement configuration (Tx point) such as for joint transmission across multiple points. Assume the eNB configures K CSI-RS measurement configuration for K CoMP transmission points. In a first example for each configured CSI-RS measurement configuration (TX point), the UE reports a co-phasing component. The co-phasing component $\theta_k$ for the k-th transmission point is a quantization of the phase shift for the per-point PMI beamforming vector. In a second example the co-phasing component $\theta_k$ is an explicit quantization of the phase, where $0 \leq \theta_k < 360$. In a third example the co-phasing component $\theta_k$, $1 < k \leq K$ is a L-bit feedback quantization of M-PSK constellation, in the set of $$\{e^{-j\frac{2\pi}{M} \times 0}, e^{-j\frac{2\pi}{M} \times 1} \ldots e^{-j\frac{2\pi}{M} \times (M-1)}\}$$

where: M=2L. The total feedback overhead is LK bits for K transmission points or L(K−1) bits if no phase information is reported for the 1st transmission point. In a fourth example the co-phasing component θ for different transmission points are jointly reported rather than separately reported for each Tx point. Thus the UE reports an index j to the co-phasing quantization codebook of size M=LKbits with:

$$\Omega = \{V_l \text{ where } l=0,1,\ldots 2^{LK}-1\} \quad (2)$$

where: Vl is a K×1 vector denoted as:

$$V_l = \begin{Bmatrix} v_{l,1} \\ v_{l,2} \\ \vdots \\ v_{l,k} \end{Bmatrix} \quad (3)$$

where: $v_{l,k}$ is the k-th digit of a sequence that denotes l in base-M value. In a fifth example the UE reports a CoMP CQI calculated under hypothesis of joint transmission from the K transmission points, under the hypothesis that the beamforming vector on the k-th transmission point is the k-th per-point $PMI_{w_k}$ rotated by a co-phasing angle of $\theta_k$. $CQI_{CoMP}$ is calculated under hypothesis of joint transmission with a composite precoding vector denoted by:

$$V_{CoMP} = \begin{Bmatrix} w_1 \theta_1 \\ w_2 \theta_2 \\ \vdots \\ w_K \theta_K \end{Bmatrix} \quad (4)$$

over the aggregated antenna array across K transmission points. Although the CoMP CQI can be reported on a hypothesis of jointly transmitting from all K transmission points, it is up to eNB scheduling to determine how many transmission points are actually used for beamforming of PDSCH data transmission. If the set of RRHs used for actual PDSCH data transmission does not involve all K transmission points, there might be a mismatch between the reported CoMP CQI and the actual SINR experienced by the PDSCH. In a further alternative the UE reports multiple CoMP CQI values, each corresponding to a unique set of RRHs for calculating the corresponding CQI. Assume the entire CoMP cooperation set is $\Omega$. The UE may report a CoMP CQI for every transmission point subset $\overline{\Omega}_i \subset \Omega$ under hypothesis of joint transmission from CoMP transmission set $\Omega_k$. This may raise an issue on the uplink feedback overhead. The UE may choose to report CoMP CQI for one transmission point subset $\Omega_k$ or a few transmission point subsets $\Omega k$ within the CoMP cooperation set $\Omega$ to reduce the feedback overhead. The UE also needs to report an indicator to the RRH subset(s) $\Omega_k$ for which the CoMP CQI is reported. The total number of transmission point subsets $\Omega_k$ for which CoMP CQI is reported can be either configured by eNB higher-layer signaling or determined by the UE based on its downlink channel measurement.

Figure 6:
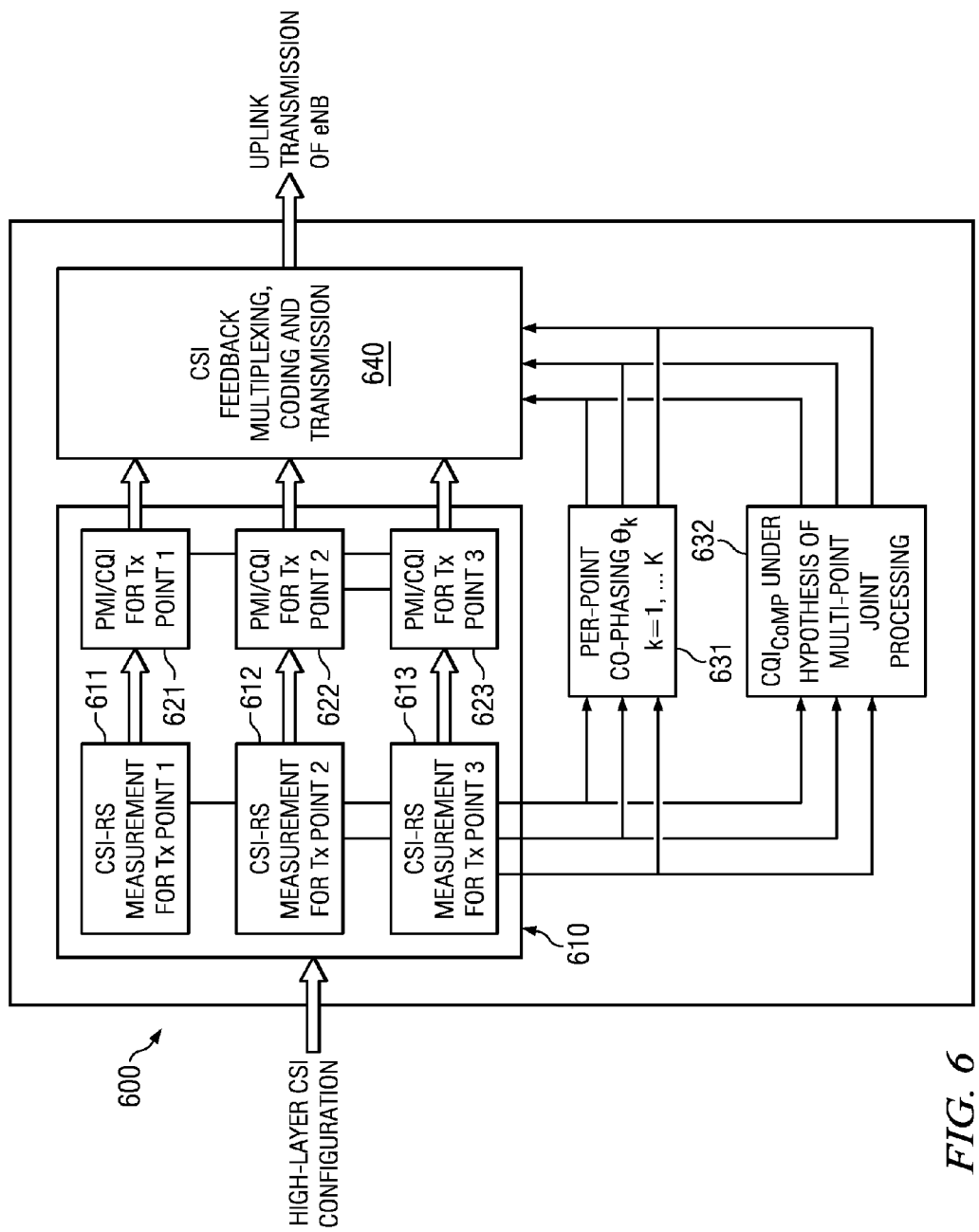
FIG. 6 illustrates a second example block diagram of circuits within a user equipment that process these Coordinated Multi-point transmissions.

FIG. 6 illustrates a block diagram of circuits within a user equipment that process these Coordinated Multi-point transmissions. User equipment 600 receives higher-layer CSI-RI configuration, generally from the main serving eNB. Receiver 610 separately processes data for distinct transmission points. FIG. 6 illustrates an example where receiver 610 of user equipment 600 is responsive to three transmission points such as illustrated in FIG. 4. Block 611 processes the CSI-RS subset data for a first transmission point (TX point 1). Block 621 forms the PMI/CQI feedback data for this first transmission point. Block 612 processes the CSI-RS subset data for a second transmission point (TX point 2), Block 622 forms the PMI/CQI feedback data for this second transmission point. Block 613 processes the CSI-RS subset data for a third transmission point (TX point 32). Block 623 forms the PMI/CQI feedback data for this third transmission point. All the feedback data is supplied to transmitter 640.

All these components are the same as illustrated in FIG. 5. FIG. 6 illustrates additional components regarding co-phasing and $CQI_{CoMP}$. Block 631 receives the CSI-RS measurements for each of the three transmission points. Block 631 generates corresponding per transmission point co-phasing component $\theta_k$ as outlined above and supplies these components to transmitter 640. Likewise block 632 receives the CSI-RS measurements for each of the three transmission points. Block 632 generates corresponding per transmission point $CQI_{CoMP}$ assuming multi-point joint processing as outlined above and supplies these components to transmitter 640. Transmitter 640 transmits the CSI feedback multiplexing, coding and transmission data as conditioned by the corresponding per-point co-phasing and $CQI_{CoMP}$ assuming multi-point joint processing via an UL to generally the primarily serving eNB. This receiving eNB then coordinates with the other serving points for communication with user equipment 600.

Due to multiple CQI/PMI feedback associated with multiple transmission points, the CSI feedback overhead is increased compared to that of Rel. 10. This feedback is more appropriately scheduled with an aperiodic report on PUSCH due to the large feedback capacity. Reporting CoMP CSI on PUCCH channel is more challenging and should not be a priority for CoMP feedback in our point of view.

Figure 7:
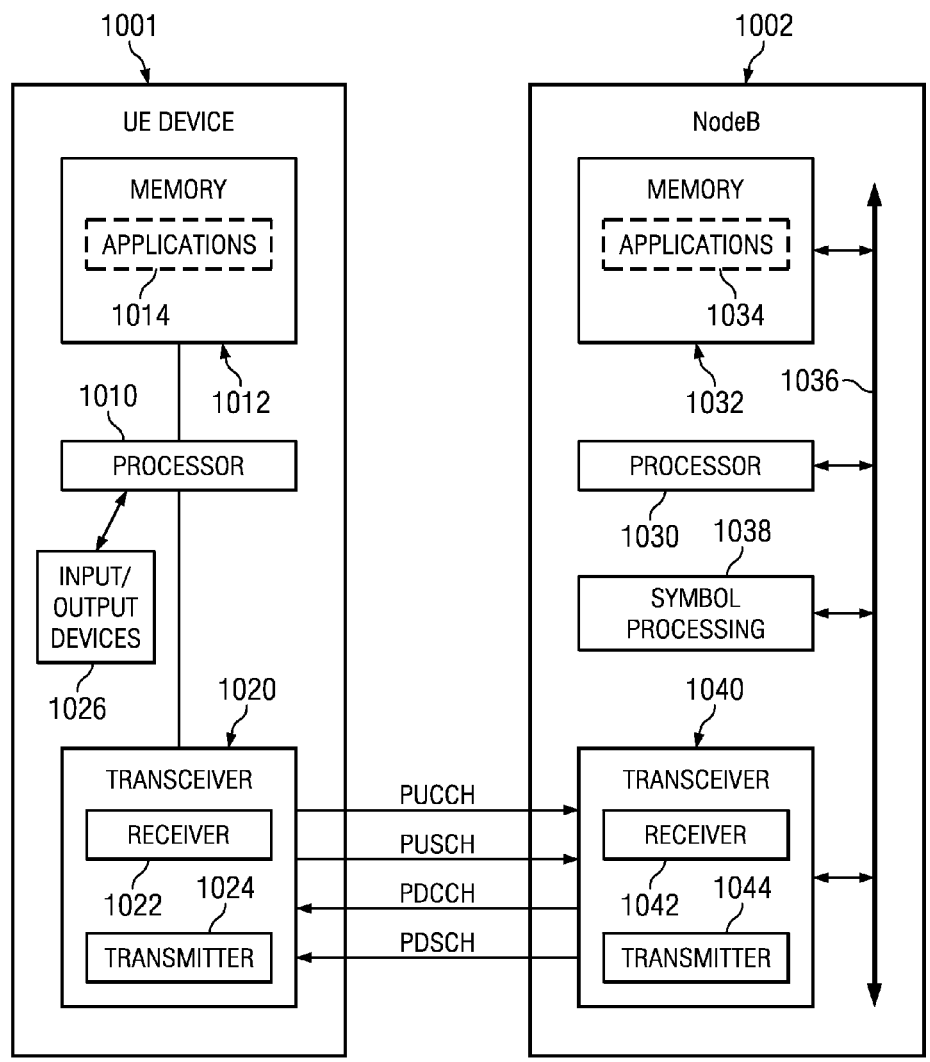
FIG. 7 is a block diagram illustrating internal details of a point and a mobile user equipment in the network system of FIG. 1 suitable for implementing this invention.

FIG. 7 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VoIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VoIP and gaming applications often involve low-latency uplink (UL) transmissions while High Throughput (HTP)/Hypertext Transmission Protocol (HTTP) traffic can involve high-latency uplink transmissions. Note the programming stored in applications memory 1014 control processor 1010 to execute the operations of this invention described above.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method of Coordinated Multipoint (CoMP) communication, comprising the steps of:
   receiving at a user equipment (UE) a plurality of channel state information reference signals (CSI-RSs) transmitted from a base station having a plurality of transmission points;
   measuring downlink channel state information at the UE for each of the plurality of CSI-RSs including a rank indicator (RI), a precoding matrix indicator (PMI) and a channel quality indicator (CQI); and
   transmitting the downlink channel state information, for a first CSI-RS in an uplink feedback channel having a first feedback periodicity and a first timing offset and transmits the downlink channel state information for a second CSI-RS in an uplink feedback channel having a second feedback periodicity and a second timing offset, said second feedback periodicity differing from said first feedback periodicity.

2. The method of claim 1, wherein:
   the rank indicators for the UE for each of the plurality of CSI-RSs are a common rank.

3. The method of claim 1, further comprising:
   said step of measuring downlink channel state information including a CQI employs a multipoint precoding hypothesis, where precoding on each transmission point uses a precoding matrix corresponding to the PMI for said corresponding transmission point; and
   said step of transmitting the downlink channel state information by at least one UE transmits the CQI in the uplink feedback channel.

4. The method of claim 3, wherein:
   the rank indicators of the CQI equals the rank of a first transmission point.

5. The method of claim 1, further comprising:
   measuring a co-phasing component at the UE for each of a plurality of transmission points; and
   transmitting the co-phasing components in the uplink feedback channel from the UE to the base station.

6. The method of claim 5, further comprising the steps of:
   said step of measuring downlink channel state information including a CQI employs a multipoint precoding hypothesis, where precoding on each transmission point uses a precoding matrix corresponding to the PMI for said corresponding transmission point whose phase is rotated by the co-phasing component for said corresponding transmission point; and said step of transmitting the downlink channel state information by at least one UE transmits the CQI in the uplink feedback channel.

7. The method of claim 6, wherein:
the rank indicators of the CQI equals the rank of a first transmission point.

8. The method of claim 1, wherein
the CSI-RSs are all generated using a common cell ID.

9. The method of claim 1, further comprising:
said step of measuring downlink channel state information including a CQI employing a multipoint precoding hypothesis, where precoding on each CSI-RS uses a precoding matrix corresponding to the PMI for said corresponding CSI-RS; and
said step of transmitting the downlink channel state information by at least one UE transmits the CQI in the uplink feedback channel.

10. The method of claim 9, wherein:
the rank indicators of the CQI equals the rank of a first CSI-RS.

11. The method of claim 1, further comprising:
measuring a co-phasing component at the UE for each of the plurality of CSI-RS; and
transmitting the co-phasing components in the uplink feedback channel from the UE to the base station.

12. The method of claim 11, further comprising the steps of:
said step of measuring downlink channel state information including a CQI employing a multipoint precoding hypothesis, where precoding on each CSI-RS uses a precoding matrix corresponding to the PMI for said corresponding CSI-RS whose phase is rotated by the co-phasing component for said corresponding CSI-RS; and
said step of transmitting the downlink channel state information by at least one UE transmits the CQI in the uplink feedback channel.

13. The method of claim 11, wherein:
the rank indicators of the CQI equals the rank of a first CSI-RS.

14. A method of Coordinated Multipoint (CoMP) communication, comprising the steps of:
receiving at a user equipment (UE) a plurality of channel state information reference signals (CSI-RSs) transmitted from a base station having a plurality of transmission points;
measuring downlink channel state information at the UE for each of the plurality of CSI-RSs including a rank indicator (RI), a precoding matrix indicator (PMI) and a channel quality indicator (CQI); and
transmitting the downlink channel state information, for a first CSI-RS in an uplink feedback channel having a first feedback periodicity and a first timing offset and transmits downlink channel state information for a second CSI-RS in an uplink feedback channel having a second feedback periodicity and a second timing offset, said second timing offset differing from said first timing offset.

15. The method of claim 14, wherein:
the rank indicators for the UE for each of the plurality of CSI-RSs are a common rank.

16. The method of claim 14, further comprising:
said step of measuring downlink channel state information including a CQI employs a multipoint precoding hypothesis, where precoding on each transmission point uses a precoding matrix corresponding to the PMI for said corresponding transmission point; and said step of transmitting the downlink channel state information by at least one UE transmits the CQI in the uplink feedback channel.

17. The method of claim 15, wherein:
the rank indicators of the CQI equals the rank of a first transmission point.

18. The method of claim 14, further comprising:
measuring a co-phasing component at the UE for each of a plurality of transmission points; and
transmitting the co-phasing components in the uplink feedback channel from the UE to the base station.

19. The method of claim 18, further comprising the steps of:
said step of measuring downlink channel state information including a CQI employs a multipoint precoding hypothesis, where precoding on each transmission point uses a precoding matrix corresponding to the PMI for said corresponding transmission point whose phase is rotated by the co-phasing component for said corresponding transmission point; and
said step of transmitting the downlink channel state information by at least one UE transmits the CQI in the uplink feedback channel.

20. The method of claim 19, wherein:
the rank indicators of the CQI equals the rank of a first transmission point.

21. The method of claim 14, wherein
the CSI-RSs are all generated using a common cell ID.

22. The method of claim 14, further comprising:
said step of measuring downlink channel state information including a CQI employing a multipoint precoding hypothesis, where precoding on each CSI-RS uses a precoding matrix corresponding to the PMI for said corresponding CSI-RS; and
said step of transmitting the downlink channel state information by at least one UE transmits the CQI in the uplink feedback channel.

23. The method of claim 22, wherein:
the rank indicators of the CQI equals the rank of a first CSI-RS.

24. The method of claim 14, further comprising:
measuring a co-phasing component at the UE for each of the plurality of CSI-RS; and
transmitting the co-phasing components in the uplink feedback channel from the UE to the base station.

25. The method of claim 24, further comprising the steps of:
said step of measuring downlink channel state information including a CQI employing a multipoint precoding hypothesis, where precoding on each CSI-RS uses a precoding matrix corresponding to the PMI for said corresponding CSI-RS whose phase is rotated by the co-phasing component for said corresponding CSI-RS; and
said step of transmitting the downlink channel state information by at least one UE transmits the CQI in the uplink feedback channel.

26. The method of claim 24, wherein:
the rank indicators of the CQI equals the rank of a first CSI-RS.

27. A wireless communication system comprising:
a base station having a plurality of transmission points; and
at least one user equipment (UE) operable to:
measure downlink channel state information using at least one transmission from the base station for each of a plurality of channel state information reference signals (CSI-RSs) including a rank indicator (RI), a precoding matrix indicator (PMI) and a channel quality indicator (CQI);

transmit the downlink channel state information for a first CSI-RS in an uplink feedback channel having a first feedback periodicity and a first timing offset; and transmit the downlink channel state information for a second CSI-RS in an uplink feedback channel having a second feedback periodicity and a second timing offset, said second feedback periodicity differing from said first feedback periodicity.

28. The wireless communication system of claim 27, wherein:
said at least one user equipment is further operable to measure rank indicators for each of the plurality of CSI-RSs as a common rank.

29. The wireless communication system of claim 27, wherein:
said at least one user equipment is further operable to measure downlink channel state information including a CQI employing a multipoint precoding hypothesis, where precoding on each transmission point uses a precoding matrix corresponding to the PMI for said corresponding point, and transmit the CQI in the uplink feedback channel.

30. The wireless communication system of claim 29, wherein:
said at least one user equipment is further operable to measure the rank indicators of the CQI as the rank of a first transmission point.

31. The wireless communication system of claim 27, wherein:
said at least one user equipment is further operable to:
measure a co-phasing component for each of a plurality of transmission points; and
transmit the co-phasing components in the uplink feedback channel to the base station.

32. The wireless communication system of claim 31, wherein:
said at least one user equipment is further operable to:
measure downlink channel state information including a CQI employing a multipoint precoding hypothesis, where precoding on each transmission point uses a precoding matrix corresponding to the PMI for said corresponding transmission point whose phase is rotated by the co-phasing component for said corresponding transmission point; and
transmit the CQI in the uplink feedback channel.

33. The wireless communication system of claim 32, wherein:
said at least one user equipment is further operable to measure the rank indicators of the CQI as the rank of a first transmission point.

34. The wireless communication system of claim 27, wherein:
the CSI-RSs are all generated using a common cell ID.

35. The wireless communication system of claim 27, wherein:
said at least one user equipment is further operable to measure downlink channel state information including a CQI employing a multipoint precoding hypothesis, where precoding on each CSI-RS uses a precoding matrix corresponding to the PMI for said corresponding CSI-RS, and transmits the CQI in the uplink feedback channel.

36. The wireless communication system of claim 35, wherein:
said at least one user equipment is further operable to measure the rank indicators of the CQI as the rank of a first CSI-RS.

37. The wireless communication system of claim 27, wherein:
said at least one user equipment is further operable to:
measure a co-phasing component for each of the plurality of CSI-RSs; and
transmit the co-phasing components in the uplink feedback channel to the base station.

38. The wireless communication system of claim 37, wherein:
said at least one user equipment is further operable to:
measure downlink channel state information including a CQI employing a multipoint precoding hypothesis, where precoding on each CSI-RS uses a precoding matrix corresponding to the PMI for said corresponding CSI-RS whose phase is rotated by the co-phasing component for said corresponding CSI-RS; and
transmit the CQI in the uplink feedback channel.

39. The wireless communication system of claim 38, wherein:
said at least one user equipment is further operable to measure the rank indicators of the CQI as the rank of a first CSI-RS.

40. A wireless communication system comprising:
a base station having a plurality of transmission points; and
at least one user equipment (UE) operable to:
measure downlink channel state information using at least one transmission from the base station for each of a plurality of channel state information reference signals (CSI-RSs) including a rank indicator (RI), a precoding matrix indicator (PMI) and a channel quality indicator (CQI);
transmit the downlink channel state information for a first CSI-RS in an uplink feedback channel having a first feedback periodicity and a first timing offset; and
transmit downlink channel state information for a second CSI-RS in an uplink feedback channel having a second feedback periodicity and a second timing offset, said second timing offset differing from said first timing offset.

41. The wireless communication system of claim 40, wherein:
said at least one user equipment is further operable to measure rank indicators for each of the plurality of CSI-RSs as a common rank.

42. The wireless communication system of claim 40, wherein:
said at least one user equipment is further operable to measure downlink channel state information including a CQI employing a multipoint precoding hypothesis, where precoding on each transmission point uses a precoding matrix corresponding to the PMI for said corresponding point, and transmit the CQI in the uplink feedback channel.

43. The wireless communication system of claim 42, wherein:
said at least one user equipment is further operable to measure the rank indicators of the CQI as the rank of a first transmission point.

44. The wireless communication system of claim 40, wherein:
said at least one user equipment is further operable to:
measure a co-phasing component for each of a plurality of transmission points; and
transmit the co-phasing components in the uplink feedback channel to the base station.

45. The wireless communication system of claim 44, wherein:
said at least one user equipment is further operable to:
measure downlink channel state information including a CQI employing a multipoint precoding hypothesis, where precoding on each transmission point uses a precoding matrix corresponding to the PMI for said corresponding transmission point whose phase is rotated by the co-phasing component for said corresponding transmission point; and
transmit the CQI in the uplink feedback channel.

46. The wireless communication system of claim 45, wherein:
said at least one user equipment is further operable to measure the rank indicators of the CQI as the rank of a first transmission point.

47. The wireless communication system of claim 40, wherein:
the CSI-RSs are all generated using a common cell ID.

48. The wireless communication system of claim 40, wherein:
said at least one user equipment is further operable to measure downlink channel state information including a CQI employing a multipoint precoding hypothesis, where precoding on each CSI-RS uses a precoding matrix corresponding to the PMI for said corresponding CSI-RS, and transmits the CQI in the uplink feedback channel.

49. The wireless communication system of claim 48, wherein:
said at least one user equipment is further operable to measure the rank indicators of the CQI as the rank of a first CSI-RS.

50. The wireless communication system of claim 40, wherein:
said at least one user equipment is further operable to:
measure a co-phasing component for each of the plurality of CSI-RSs; and
transmit the co-phasing components in the uplink feedback channel to the base station.

51. The wireless communication system of claim 50, wherein:
said at least one user equipment is further operable to:
measure downlink channel state information including a CQI employing a multipoint precoding hypothesis, where precoding on each CSI-RS uses a precoding matrix corresponding to the PMI for said corresponding CSI-RS whose phase is rotated by the co-phasing component for said corresponding CSI-RS; and
transmit the CQI in the uplink feedback channel.

52. The wireless communication system of claim 51, wherein:
said at least one user equipment is further operable to measure the rank indicators of the CQI as the rank of a first CSI-RS.

53. A user equipment in a wireless communication system comprising:
a receiver operable to receive a plurality of channel state information reference signals (CSI-RSs) from a base station having a plurality of transmission points;
a transmitter operable to send transmissions to said base station having said plurality of transmission points; and
a data processor connected to said receiver and said transmitter, said data processor programmed to:
measure downlink channel state information for each of the plurality of CSI-RSs—from transmissions received from said base station including a rank indicator (RI), a precoding matrix indicator (PMI) and a channel quality indicator (CQI);
control said transmitter to report the downlink channel state information for a first CSI-RS in an uplink feedback channel having a first feedback periodicity and a first timing offset; and
control said transmitter to report the downlink channel state information for a second CSI-RS in an uplink feedback channel having a second feedback periodicity and a second timing offset, said second feedback periodicity differing from said first feedback periodicity.

54. The user equipment in a wireless communication system of claim 53, wherein:
said data processor is further programmed to measure rank indicators for each of the plurality of CSI-RSs as a common rank.

55. The user equipment in a wireless communication system of claim 53, wherein:
said data processor is further programmed to:
measure downlink channel state information including a CQI employing a multipoint precoding hypothesis, where precoding on each transmission point uses a precoding matrix corresponding to the PMI for said corresponding transmission point; and
control said transmitter to report the CQI in the uplink feedback channel.

56. The user equipment in a wireless communication system of claim 55, wherein:
said data processor is further programmed to measure the rank indicators of the CQI as the rank of a first transmission point.

57. The user equipment in a wireless communication system of claim 53, wherein:
said data processor is further programmed to:
measure a co-phasing component for each of a plurality of transmission points; and
control said transmitter to report the co-phasing components in the uplink feedback channel to the base station.

58. The user equipment in a wireless communication system of claim 57, wherein:
said data processor is further programmed to:
measure downlink channel state information including a CQI employing a multipoint precoding hypothesis, where precoding on each transmission point uses a precoding matrix corresponding to the PMI for said corresponding transmission point whose phase is rotated by the co-phasing component for said corresponding point; and
control said transmitter to report the CQI in the uplink feedback channel.

59. The user equipment in a wireless communication system of claim 58, wherein:
said data processor is further programmed to measure the rank indicators of the CQI as the rank of a first transmission point.

60. The user equipment in a wireless communication system of claim 53, wherein:
the CSI-RSs are all generated using a common cell ID.

61. The user equipment in a wireless communication system of claim 53, wherein:
said data processor is further programmed to:
measure downlink channel state information including a CQI employing a multipoint precoding hypothesis, where precoding on each CSI-RS uses a precoding matrix corresponding to the PMI for said corresponding CSI-RS; and
control said transmitter to report the CQI in the uplink feedback channel.

62. The user equipment in a wireless communication system of claim 61, wherein:
said data processor is further programmed to measure the rank indicators of the CQI as the rank of a first CSI-RS.

63. The user equipment in a wireless communication system of claim 53, wherein:
said data processor is further programmed to:
measure a co-phasing component for each of the plurality of CSI-RS; and
control said transmitter to report the co-phasing components in the uplink feedback channel to the base station.

64. The user equipment in a wireless communication system of claim 63, wherein:
said data processor is further programmed to:
measure downlink channel state information including a CQI employing a multipoint precoding hypothesis, where precoding on each CSI-RS uses a precoding matrix corresponding to the PMI for said corresponding CSI-RS whose phase is rotated by the co-phasing component for said corresponding CSI-RS; and
control said transmitter to report the CQI in the uplink feedback channel.

65. The user equipment in a wireless communication system of claim 64, wherein:
said data processor is further programmed to measure the rank indicators of the CQI as the rank of a first CSI-RS.

66. A user equipment in a wireless communication system comprising:
a receiver operable to receive a plurality of channel state information reference signals (CSI-RSs) from a base station having a plurality of transmission points;
a transmitter operable to send transmissions to said base station having said plurality of transmission points;
a data processor connected to said receiver and said transmitter, said data processor programmed to:
measure downlink channel state information for each of the plurality of CSI-RSs—from transmissions received from said base station including a rank indicator (RI), a precoding matrix indicator (PMI) and a channel quality indicator (CQI);
control said transmitter to report the downlink channel state information for a first CSI-RS in an uplink feedback channel having a first feedback periodicity and a first timing offset; and
control said transmitter to report downlink channel state information for a second CSI-RS in an uplink feedback channel having a second feedback periodicity and a second timing offset, said second timing offset differing from said first timing offset.

67. The user equipment in a wireless communication system of claim 66, wherein:
said data processor is further programmed to measure rank indicators for each of the plurality of CSI-RSs as a common rank.

68. The user equipment in a wireless communication system of claim 66, wherein:
said data processor is further programmed to:
measure downlink channel state information including a CQI employing a multipoint precoding hypothesis, where precoding on each transmission point uses a precoding matrix corresponding to the PMI for said corresponding transmission point; and
control said transmitter to report the CQI in the uplink feedback channel.

69. The user equipment in a wireless communication system of claim 68, wherein:
said data processor is further programmed to measure the rank indicators of the CQI as the rank of a first transmission point.

70. The user equipment in a wireless communication system of claim 66, wherein:
said data processor is further programmed to:
measure a co-phasing component for each of a plurality of transmission points; and
control said transmitter to report the co-phasing components in the uplink feedback channel to the base station.

71. The user equipment in a wireless communication system of claim 70, wherein:
said data processor is further programmed to:
measure downlink channel state information including a CQI employing a multipoint precoding hypothesis, where precoding on each transmission point uses a precoding matrix corresponding to the PMI for said corresponding transmission point whose phase is rotated by the co-phasing component for said corresponding point; and
control said transmitter to report the CQI in the uplink feedback channel.

72. The user equipment in a wireless communication system of claim 71, wherein:
said data processor is further programmed to measure the rank indicators of the CQI as the rank of a first transmission point.

73. The user equipment in a wireless communication system of claim 66, wherein:
the CSI-RSs are all generated using a common cell ID.

74. The user equipment in a wireless communication system of claim 66, wherein:
said data processor is further programmed to:
measure a co-phasing component for each of the plurality of CSI-RS; and
control said transmitter to report the co-phasing components in the uplink feedback channel to the base station.

75. The user equipment in a wireless communication system of claim 74, wherein:
said data processor is further programmed to:
measure downlink channel state information including a CQI employing a multipoint precoding hypothesis, where precoding on each CSI-RS uses a precoding matrix corresponding to the PMI for said corresponding CSI-RS whose phase is rotated by the co-phasing component for said corresponding CSI-RS; and
control said transmitter to report the CQI in the uplink feedback channel.

76. The user equipment in a wireless communication system of claim 75, wherein:
said data processor is further programmed to measure the rank indicators of the CQI as the rank of a first CSI-RS.

77. An apparatus, comprising:
circuitry for receiving at a user equipment (UE) a plurality of channel state information reference signals (CSI-RSs) from a base station having a plurality of transmission points;
circuitry for measuring downlink channel state information at the UE for each of the plurality of CSI-RSs including a rank indicator (RI), a precoding matrix indicator (PMI) and a channel quality indicator (CQI);
circuitry for transmitting the downlink channel state information for a first CSI-RS in an uplink feedback channel having a first feedback periodicity and a first timing offset from the UE to the base station; and
circuitry for transmitting the downlink channel state information for a second CSI-RS in an uplink feedback channel having a second feedback periodicity and a second timing offset, said second feedback periodicity differing from said first feedback periodicity from the UE to the base station.

78. The apparatus of claim 77, wherein:
the CSI-RSs are all generated using a common cell ID.

79. An apparatus, comprising:
circuitry for receiving at a user equipment (UE) a plurality of channel state information reference signals (CSI-RSs) from eNBs having transmission points; circuitry for measuring downlink channel state information at the UE for each of the CSI-RSs including a rank indicator (RI), a precoding matrix indicator (PMI) and a channel quality indicator (CQI);
circuitry for transmitting the downlink channel state information for a first CSI-RS in an uplink feedback channel having a first feedback periodicity and a first timing offset from the UE to a serving one of the eNBs; and
circuitry for transmitting the downlink channel state information for a second CSI-RS in an uplink feedback channel having a second feedback periodicity and a second timing offset, said second feedback periodicity differing from said first feedback periodicity from the UE to a serving one of the eNBs.

80. The apparatus of claim 79, wherein:
the CSI-RSs are all generated using a common cell ID.

81. A method, comprising:
receiving at a user equipment (UE) a plurality of channel state information reference signals (CSI-RSs) from at least two eNBs having transmission points;
measuring downlink channel state information at the UE for each of the CSI-RSs-including a rank indicator (RI), a precoding matrix indicator (PMI) and a channel quality indicator (CQI);
transmitting downlink channel state information for a first CSI-RS in an uplink feedback channel having a first feedback periodicity and a first timing offset from the UE to at least one of the eNBs; and
transmitting the downlink channel state information for a second CSI-RS in an uplink feedback channel having a second feedback periodicity and a second timing offset, said second feedback periodicity differing from said first feedback periodicity from the UE to at least one of the eNBs.

82. The method of claim 81, wherein:
the CSI-RSs are all generated using a common cell ID.

83. An apparatus, comprising:
circuitry for receiving at a user equipment (UE) a plurality of channel state information reference signals (CSI-RSs) from eNBs each having multiple transmission points;
circuitry for measuring downlink channel state information at each UE for each of the CSI-RSs including a rank indicator (RI), a precoding matrix indicator (PMI) and a channel quality indicator (CQI);
circuitry for transmitting the downlink channel state information for a first CSI-RS in an uplink feedback channel having a first feedback periodicity and a first timing offset, wherein the downlink channel state information feedback includes at least one of a channel quality indicator (CQI), rank indicator (RI), or precoding matrix indicator (PMI); and
circuitry for transmitting the downlink channel state information for a second CSI-RS in an uplink feedback channel having a second feedback periodicity and a second timing offset, said second feedback periodicity differing from said first feedback periodicity, wherein the downlink channel state information feedback includes at least one of a channel quality indicator (CQI), rank indicator (RI), or precoding matrix indicator (PMI).

84. The apparatus of claim 83, comprising:
the CSI-RSs are all generated using a common cell ID.

85. An apparatus, comprising:
circuitry for receiving at a user equipment (UE) a plurality of channel state information reference signals (CSI-RSs) from a base station having a plurality of transmission points;
circuitry for measuring downlink channel state information at the UE for each of the plurality of CSI-RSs including a rank indicator (RI), a precoding matrix indicator (PMI) and a channel quality indicator (CQI);
circuitry for transmitting the downlink channel state information for a first CSI-RS in an uplink feedback channel having a first feedback periodicity and a first timing offset from the UE to the base station; and
circuitry for transmitting the downlink channel state information for a second CSI-RS in an uplink feedback channel having a second feedback periodicity and a second timing offset, said second timing offset differing from said first timing offset from the UE to the base station.

86. The apparatus of claim 85, wherein:
the CSI-RSs are all generated using a common cell ID.

87. An apparatus, comprising:
circuitry for receiving at a user equipment (UE) a plurality of channel state information reference signals (CSI-RSs) from eNBs having transmission points;
circuitry for measuring downlink channel state information at the UE for each of the CSI-RSs including a rank indicator (RI), a precoding matrix indicator (PMI) and a channel quality indicator (CQI);
circuitry for transmitting the downlink channel state information for a first CSI-RS in an uplink feedback channel having a first feedback periodicity and a first timing offset from the UE to a serving one of the eNBs; and
circuitry for transmitting the downlink channel state information for a second CSI-RS in an uplink feedback channel having a second feedback periodicity and a second timing offset, said second timing offset differing from said first timing offset from the UE to a serving one of the eNBs.

88. The apparatus of claim 87, wherein:
the CSI-RSs are all generated using a common cell ID.

89. A method, comprising:
receiving at a user equipment (UE) a plurality of channel state information reference signals (CSI-RSs) from at least two eNBs having transmission points;
measuring downlink channel state information at the UE for each of the CSI-RSs including a rank indicator (RI), a precoding matrix indicator (PMI) and a channel quality indicator (CQI); and
transmitting the downlink channel state information for a first CSI-RS in an uplink feedback channel having a first feedback periodicity and a first timing offset from the UE to at least one of the eNBs; and
transmitting the downlink channel state information for a second CSI-RS in an uplink feedback channel having a second feedback periodicity and a second timing offset from the UE to at least one of the eNBs, said second timing offset differing from said first timing offset.

90. The method of claim 89, wherein:
the CSI-RSs are all generated using a common cell ID.

91. An apparatus, comprising:
circuitry for receiving at a user equipment (UE) a plurality of channel state information reference signals (CSI-RSs) from eNBs each having multiple transmission points;

circuitry for measuring downlink channel state information at each UE for each of the CSI-RSs including a rank indicator (RI), a precoding matrix indicator (PMI) and a channel quality indicator (CQI);

circuitry for transmitting the downlink channel state information for a first CSI-RS in an uplink feedback channel having a first feedback periodicity and a first timing offset, wherein the downlink channel state information feedback includes at least one of a channel quality indicator (CQI), rank indicator (RI), or precoding matrix indicator (PMI); and circuitry for transmitting the downlink channel state information for a second CSI-RS in an uplink feedback channel having a second feedback periodicity and a second timing offset, said second feedback periodicity differing from said first feedback periodicity, wherein the downlink channel state information feedback includes at least one of a channel quality indicator (CQI), rank indicator (RI), or precoding matrix indicator (PMI).

* * * * *